UNITED STATES PATENT OFFICE.

FRANCIS C. PHILLIPS, OF ALLEGHENY CITY, PENNSYLVANIA.

EXTRACTING BROMINE AND IODINE FROM BITTERN.

SPECIFICATION forming part of Letters Patent No. 356,292, dated January 18, 1887.

Application filed May 5, 1886. Serial No. 201,216. (No specimens.)

*To all whom it may concern:*

Be it known that I, FRANCIS C. PHILLIPS, of Allegheny City, in the county of Allegheny and State of Pennsylvania, have invented a new and useful Improvement in Extracting Bromine and Iodine from Bittern; and I do hereby declare the following to be a full, clear, and exact description thereof.

My invention relates to the treatment of the bittern obtained from the salt-crystallizing vats in the manufacture of the salt of commerce from salt-water, this brine or bittern being gradually concentrated by the evaporation of water therefrom and the salt being crystallized in the vats as the water is driven off therefrom. This bittern contains a large proportion of bromine and a small proportion of iodine, and, as heretofore generally practiced, the bromine has been obtained from the bittern by treating it in a sandstone still in the presence of sulphuric acid and chlorate of potash or binoxide of manganese, the bittern, with these substances, being heated and the bromine set free and distilled over in vapor, which is condensed by suitable means, only the bromine being recovered by this process and the iodine being entirely lost.

In an application for patent filed by me January 14, 1886, Serial No. 188,544, is described a process for recovering the iodine from the bittern and subsequent recovery of the bromine, the iodine being set free from the chemical combination in which it occurs in the bittern and subsequently absorbed from the bittern and thus removed therefrom, and the bittern being then treated in the manner above described to obtain the bromine therefrom.

My present invention relates to the simultaneous recovery of both the bromine and the iodine from the bittern, thus overcoming the necessity of two separate treatments of the bittern.

It consists, essentially, as an improvement in the art of obtaining bromine and iodine from salt-water bittern, in treating the bittern in such manner as to liberate the bromine and iodine from the bromides and iodides which occur in the bittern, and then absorbing therefrom the free bromine and iodine held in mechanical solution therein.

It also consists in certain steps in the art, first, to recover the bromine and iodine from the bittern, and subsequently to obtain these substances in pure form.

To enable others skilled in the art to practice my invention, I will describe the same more fully.

The mother-liquor or bittern obtained by the evaporation of the salt-water and containing bromine and iodine, as above described, is first tested chemically to ascertain the proportion of bromine and iodine contained therein. In case it is found to contain any iodates, suitable reducing agents in calculated quantities to convert the iodates into iodides or hydriodic acid are introduced, sulphite of soda in sufficient quantity being suitable for the purpose, and a calculated quantity of sulphuric acid being added to render efficient the action of the sulphite of soda. The bromine and iodine are then present in combination as bromides and iodides, or hydriodic acid, and the first step is to set free the bromine and iodine from these chemical combinations, so that they will be present in the bittern only in mechanical solution. This is accomplished by the introduction in proper quantities of an oxidizing agent capable of setting free both the bromine and iodine—such as chlorine gas, or a mixture of binoxide of manganese and sulphuric acid, or chlorate of potash and sulphuric acid. After this treatment the free iodine and bromine are held mechanically dissolved in the bittern, but in an uncombined state, and the bittern appears of a yellow color. It is then necessary to absorb the free bromine and iodine from the bittern, and this I accomplish by adding a quantity of oil or other suitable absorbent material and thoroughly agitating the bittern, either in a cold state or, preferably, at a very gentle heat. The absorbent material employed for this purpose must be carefully chosen, as some oils dissolve too little and others combine so readily with the free bromine and iodine that they cannot be easily separated to obtain the free bromine and iodine. I have found the material best suited for the purpose to be the "dead-oil" from coal-tar, sometimes also termed "heavy oil." Coal-tar and the various oils therefrom, as well as the heavy oils from the distillation of petroleum, may also be used. The quantity of absorbent material employed will of course vary according to the quantity of bromine and iodine present, about ten (10) parts of the dead-oil to one (1) part of bromine and iodine contained in the bittern being sufficient, and after the introduction of the absorbent the bittern and oil are agitated until all the bromine and iodine are absorbed by the oil, a gentle heat being preferably applied. The absorbent containing the bromine and iodine is then separated from the bittern and this step is complete. The oil used as an absorbent is then placed within an air-tight boiler, termed by me a "digester," with water and a quantity of a strongly alkaline substance—such as caustic soda, potash, or lime—and exposed to steam heat and a pressure of from five to fifteen atmospheres, the contents of the digester being agitated by means of suitable stirring apparatus. The alkaline substance preferably used is caustic soda, it being used in about the following proportions: three parts caustic soda and four parts water to one part of bromine and iodine contained in the oil. This treatment is continued for several hours, when it is found that the bromine and iodine have been taken up from the oil by the alkaline substance, the oil being in condition for treating a fresh portion of bittern. After the separation of the oil and alkaline fluid containing the bromine and iodine the alkaline fluid may be concentrated, if necessary, and the bromine and iodine liberated separately therefrom in any suitable manner, either by distillation with binoxide of manganese and sulphuric acid or by any of the processes in use for the separation of these elements from the mother-liquors of kelp, each substance being thus obtained in a pure and marketable condition.

By my invention I am enabled to obtain both the bromine and iodine from the salt-water bittern, rendering the subsequent treatment thereof for the recovery of the bromine unnecessary, and recovering both elements at almost as low a cost as that required for the recovery of the iodine only in the process described in my application above referred to.

What I claim as my invention, and desire to secure by Letters Patent, is—

1. The herein-described improvement in the art of obtaining bromine and iodine from salt-water bittern, consisting in setting the bromine and iodine free from the chemical combinations in which they occur in the bittern and absorbing simultaneously the free bromine and iodine from the bittern, substantially as and for the purposes set forth.

2. As a step in the art of obtaining bromine and iodine from salt-water bittern, setting free the bromine and iodine from the chemical combinations in which they occur therein and absorbing both bromine and iodine from the bittern with dead-oil or equivalent absorbent, substantially as and for the purposes set forth.

3. The herein described improvement in the art of obtaining bromine and iodine from salt-water bittern, consisting in setting free the bromine and iodine from the chemical combination in which they occur therein, absorbing both the bromine and iodine from the bittern with dead-oil or equivalent material, extracting the bromine and iodine from the absorbent by means of an alkaline substance, and extracting the bromine and iodine separately from the alkaline substance, substantially as and for the purposes set forth.

In testimony whereof I, the said FRANCIS C. PHILLIPS, have hereunto set my hand.

FRANCIS C. PHILLIPS.

Witnesses:
JAMES I. KAY,
J. N. COOKE.